Feb. 18, 1930. A. B. FRENIER 1,747,357
AUXILIARY CONTROL DEVICE
Filed Dec. 12, 1924 2 Sheets-Sheet 1
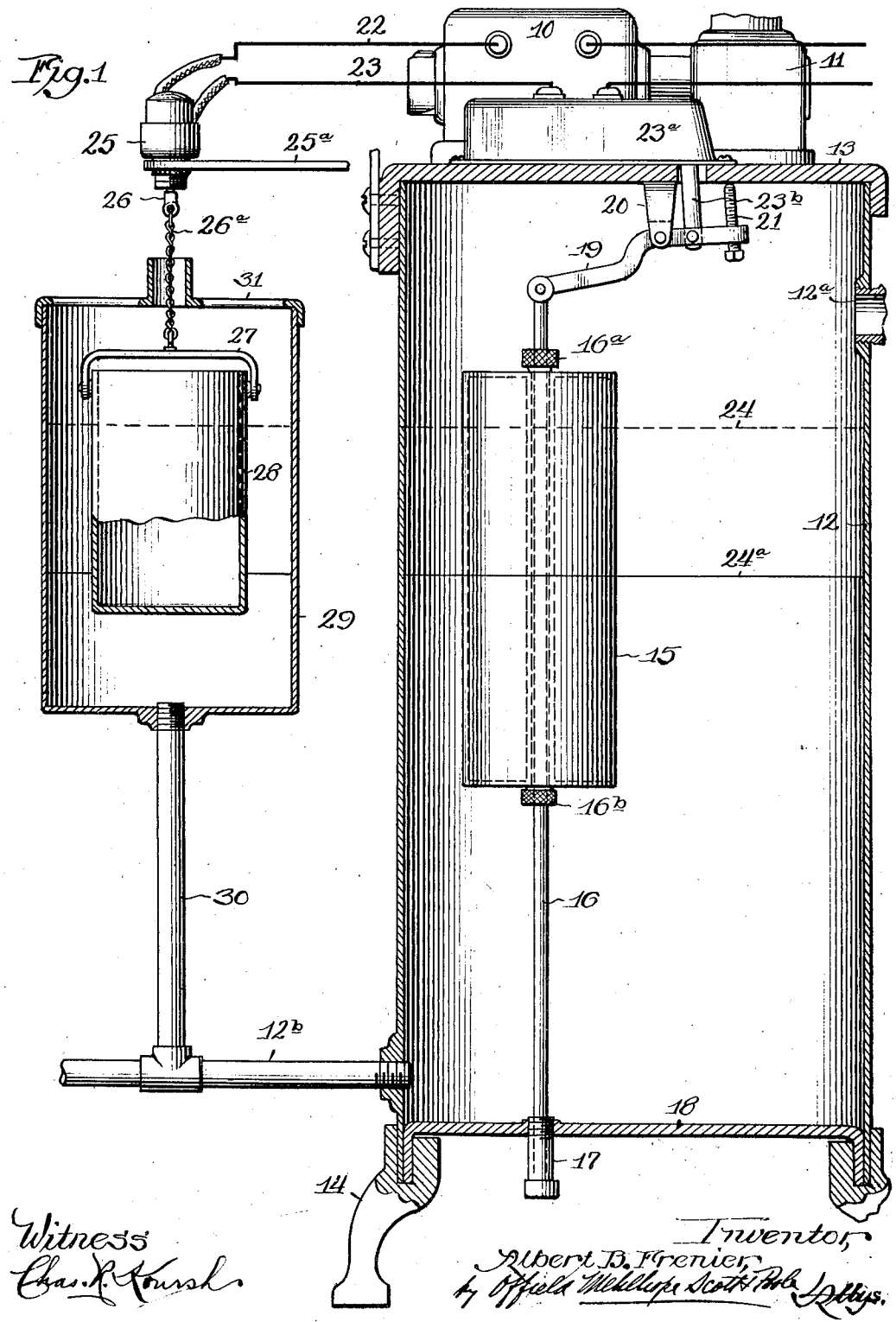

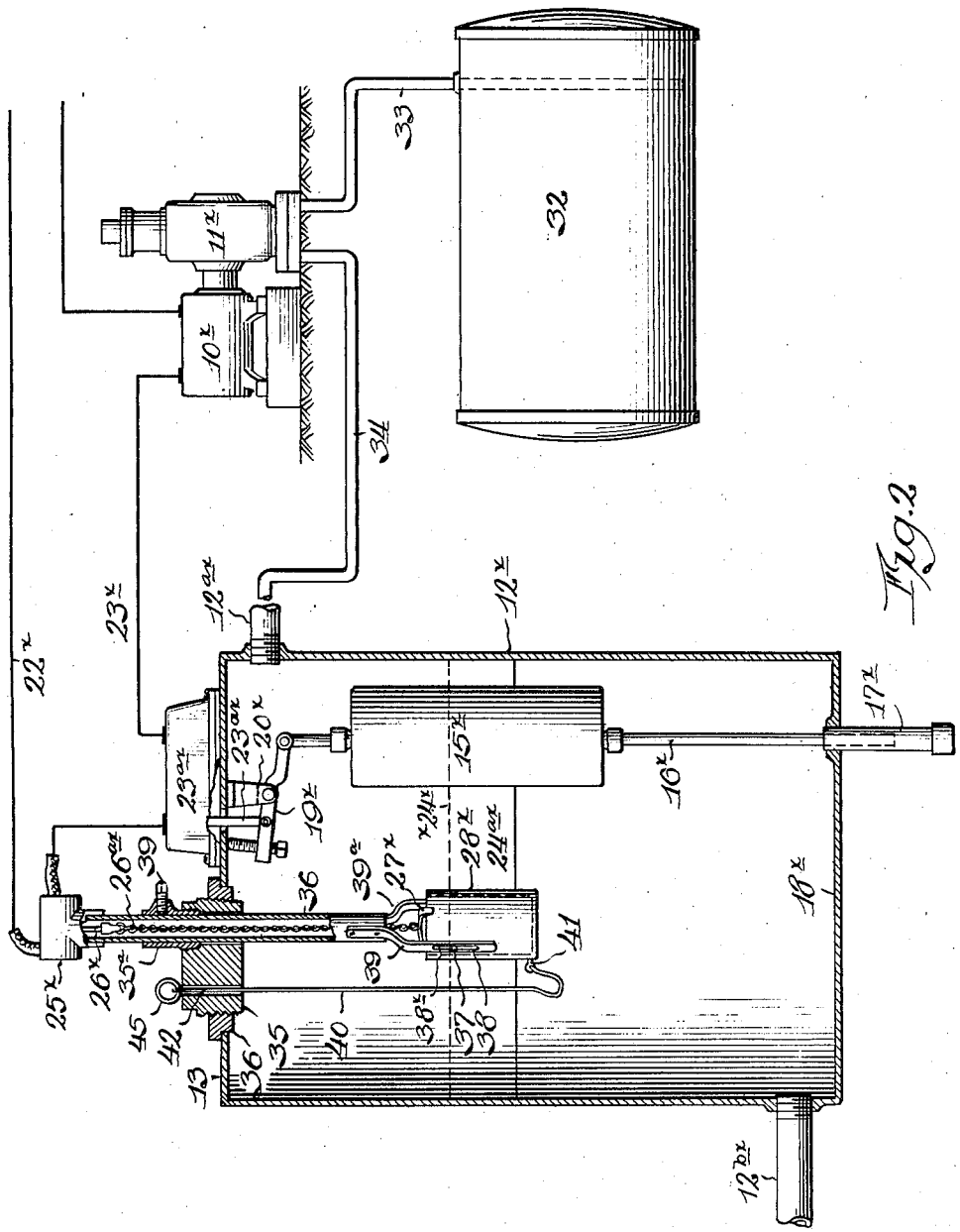

Patented Feb. 18, 1930

1,747,357

UNITED STATES PATENT OFFICE

ALBERT B. FRENIER, OF CHICAGO, ILLINOIS, ASSIGNOR, BY MESNE ASSIGNMENTS, TO PETROLEUM HEAT AND POWER COMPANY, OF NEW YORK, N. Y., A CORPORATION OF DELAWARE

AUXILIARY CONTROL DEVICE

Application filed December 12, 1924. Serial No. 755,586.

This invention relates to a novel and improved auxiliary control device for float control liquid feeding apparatus and consists of the matters hereinafter described and more particularly pointed out in the appended claims.

In liquid feeding apparatus, whether by pump, gravity or other force, in which a float and float chamber are employed to control the flow of liquid from a storage or service tank to the point where the liquid is used or consumed, the float operates at two levels of the liquid in the float chamber; namely a low level, at which it operates to start the feeding apparatus into operation and a high level at which it shuts off or stops said feeding apparatus. The proper operation of the apparatus depends primarily and essentially upon the float, which, if in proper working order, will not fail in its intended function.

Floats, however, are apt to become logged by puncture or otherwise, in which case they will fail to rise with the rise of liquid in the float chamber, so that when the predetermined high level of liquid in the float chamber is reached, the float will fail to act and the feeding apparatus will continue to operate, thus flooding the float chamber. Some means, as an overflow pipe has been employed to take care of the excess liquid; but then comes the problem of disposing of the overflow. In original installations this may be done of course through a return pipe to the reservoir tank. This, however, requires double piping and is expensive, particularly when the float control is applied to old installations and where the reservoir is located at some distance from the point of use or of consumption of the liquid.

Again, there is the possibility of a failure of the float, after it has come to the lower level in the float chamber, and has started the feeding apparatus into operation, as when, by reason of excess flow towards the point of use or consumption, due to breakage in the line or otherwise, the liquid flows from the float chamber at a greater rate than it is supplied by the feed to the float chamber. In such case the level of the liquid in the float chamber will fall below the predetermined low level and will continue to fall, instead of rising as it should, in order to shut off the feed. The liquid will then continue to flow and waste until the trouble is discovered and the feeding apparatus is shut off by hand.

The failure of operation of the float at the two predetermined levels, high level and low level, as above described, becomes a menace when the liquid fed is inflammable or explosive, and for this reason float controlled liquid feeding apparatus has not been fully approved nor has it met the safety requirements in the case of fuel oil feed for burners in furnaces for domestic and commercial use.

The object of the present invention is to produce an auxiliary control device for use with a float controlled feeding apparatus, which auxiliary control will supplement the action of the float and act to shut off or stop the feed when the float fails of operation, and which will operate, whether the float fails at either the predetermined high level or at the predetermined low level of the liquid in the float chamber.

The purpose of the improved auxiliary control is to do the only thing possible or desirable when the float fails, that is to automatically shut down the feed and prevent further flow of the liquid from the service or reservoir tank until the float has been repaired or replaced.

The advantages of the invention will appear more fully as I proceed with my specification.

In the drawings:—

Figure 1 is a view representing in vertical central section a familiar float controlled liquid feeding apparatus, namely, an automatic oil feed pump, to which is applied my auxiliary control device.

Figure 2 is a view partly in vertical central section and partly in vertical elevation representing another automatic oil feed pump with the reservoir tank with which it is connected and with a somewhat modified form of the auxiliary control device applied to the float chamber.

In illustrating and describing my invention, I have presented it as applied to automatic oil pumps such as used in connection with fuel supply for oil burners in domestic and commercial furnaces, since such float controlled liquid feeding apparatus operate under conditions when the failure of the float is apt to have the most serious consequences. Its application to other apparatus, however, will be apparent.

Referring now to that embodiment of the invention illustrated in the drawings and particularly to Figure 1:—10 indicates the electric motor, 11, the pump driven thereby, and 12 indicates a small tank which encloses the float chamber of an automatic oil pump installation of familiar construction. The motor 10 and pump 11 are supported on the cap 13 of the tank 12, which, itself, is provided with a suitable base 14 resting upon the floor. 15 indicates the usual float mounted on a vertical rod 16 between top and bottom collars $16^a$, $16^b$, thereon. The rod 16 has guiding relation in a pipe 17 depending below the bottom wall 18 of the tank 12. Said rod is pivotally connected at its upper end to a lever 19, fulcrumed intermediate its ends upon a bracket 20 depending from the top wall 13 of the tank. An adjustable stop in the form of a screw 21 threaded through one end of the lever 19 is adapted for engagement with the underside of the top wall of the tank to limit the downward movement of the float.

22, 23 indicate electric conductor wires connected to the motor 10 and $23^a$ indicates a snap switch interposed in the circuit of one of said conductor wires, as 23. $23^b$ indicates a link which operates the switch $23^a$, said link being connected to the lever 19 between the fulcrum bracket 20 and the stop screw 21.

24 and $24^a$ indicate respectively the high and low levels of liquid in the float chamber. Liquid is admitted to the tank 12 through the inlet pipe $12^a$, which may lead either from a large reservoir tank buried in the ground outside the residence or factory in which the burner to be supplied is located or may lead from a comparatively large service tank located in the residence or factory building. $12^b$ indicates the pipe leading to the place of consumption or use, as the burner in the furnace.

As shown in the drawings, the liquid in the float chamber has just reached the low level $24^a$ and the float, falling with the liquid, has swung the lever 19 to move the link $23^b$ upwardly to close the switch $23^a$ and start the motor 10. Liquid is thus being pumped into the float chamber through the inlet pipe $12^a$. The pump continues to operate until the liquid rises to the high level, 24, in the float chamber, when the float will have been raised sufficiently to swing the lever 19 to pull down the link $23^b$ so as to open the switch $23^a$, whereupon the motor is stopped and the inflow through the inlet pipe $12^a$ ceases.

My auxiliary control, in the embodiment of the invention illustrated herein as applied to an electric motor driven pump, includes an auxiliary switch in the motor circuit. 25 indicates such switch, which as shown, is a snap switch interposed in the conductor 23, between the switch $23^a$ and the motor 10 and supported on the tank 12 by an arm $25^a$. Said switch is normally closed and inoperative to affect the supply of current to the motor, but is designed to be opened to break the motor circuit when the float becomes logged and fails to operate at the upper level 24 of liquid in the float chamber or when the float, having operated its switch to start the motor, fails to operate because the liquid continues to fall below the low level $24^a$ on account of a break in the pipe $12^b$ and the outflow of liquid from the float chamber at a greater rate than the inflow through the pipe $12^a$.

The switch 25 is operated by a link 26, which as shown is connected by a chain $26^a$ and bail 27 to a bucket 28. As illustrated in Figure 1, said bucket floats in a body of liquid in a small auxiliary, open vessel 29 connected by a pipe 30 to the tank 12, as through the outflow pipe $12^b$, so that the level of the body of liquid in the vessel 29 will always be the same as the level of the body of liquid in the float chamber.

A removable open cap or spider, 31, at the top of the vessel 29 provides a stop or abutment to arrest and limit the upward movement of the bucket 28. The bucket normally floats in the liquid in the vessel 29 but is of sufficient weight to exert a pull on the chain $26^a$ and link 26, to open the snap switch 25, when the body of liquid in said vessel falls below the low level $24^a$ in the float chamber 12. On the other hand a rise of the liquid in the vessel 29 above the high level 24 in the float chamber, will raise the bucket until its further rise is arrested by its bail 27 striking the open cap or spider 31 at the top of the vessel. The continued further rise of the liquid will finally reach the top of the bucket so that the liquid will flow into and fill the bucket to a point so that it will no longer float and will sink in the liquid in the vessel. Such sinking of the bucket will exert a pull on the chain $26^a$ to open the switch 25.

Thus in either case, whether the liquid fall below the low level $24^a$ in the float chamber or whether it rise above the high level 24 in said chamber, the switch 25 will be operated to open the motor circuit and stop the pump and motor. Manifestly the auxiliary control acts to stop the further feed of liquid, when the float in the float chamber fails of operation for any cause.

When the bucket 28, has become filled or partially filled with liquid, as when it acts above the high level of the liquid in the float chamber, it may be emptied (after the float is repaired or replaced) by removing the cap or spider 31 and withdrawing it from the vessel 29.

In Figure 2, the invention is shown in a slightly modified form. Therein similar parts are indicated by the same numerals used heretofore, with the suffix "x". In this case the motor 10$^x$ and pump 11$^x$ are shown as being remote from the float chamber 12$^x$ and switch 23$^{ax}$, and in the vicinity of the service tank 32 to which the pump is connected by a pipe 33. A pipe 34 leads from the pump to the inlet pipe 12$^{ax}$ in the float chamber tank 12$^x$.

In this case, the auxiliary vessel 29, is dispensed with,—the bucket 28$^x$ being suspended in the float chamber 12$^x$. To introduce the bucket into the float chamber, an opening or hole is made in the top wall 13$^x$ of the tank 12$^x$. In said hole is secured a threaded plug 35 provided with a head or other means for turning it as a screw. Said plug may be screwed into a reinforcing, threaded collar 36 applied to the hole in the top wall of the tank. The plug 35 is bored vertically to receive a tube 36 to the bottom end of which is secured a forked arm 38 within which is suspended a bucket 28$^x$. The bucket has laterally disposed studs 37 which engage in vertical slots 38 in the depending tines 39 of the forked arm 38. The bucket 28$^x$ is thus movable vertically with reference to the tube 36. The tube itself extends above the body of the plug 35 and through a reduced tubular extension 35$^a$ thereof in which the tube 36 is fixed by means of a set-screw 39. By this means the tube 36 is made vertically adjustable to bring the bucket 28$^x$ to the proper level in the float chamber with reference to the upper and lower levels 24$^x$, 24$^x$ thereof. The bucket 28$^x$ is of somewhat smaller diameter than the opening in which the plug 35 is engaged, so that it may be introduced into or withdrawn from the float chamber when desired.

The snap switch 25$^x$ is in this case mounted at the top end of the tube 36 and its operating link 26$^x$ and the chain 26$^{ax}$ by which it is connected to the bucket 28$^x$ extends down through the tube 36. The chain 26$^{ax}$ is connected to a bail 27$^x$ at the top of the bucket as before.

The operation of the bucket will be the same in this case as before. Said bucket 28 by its own weight, when the liquid in the float chamber falls below the low level 24$^{ax}$, so that the bucket is no longer floated, will pull the chain 26$^{ax}$ and open the switch 25$^x$ to stop the motor and pump. On the other hand, when the liquid in the float chamber rises above the high level 24$^x$, the bucket 28$^x$ will continue to rise until arrested by engagement with the horizontal parts 39$^a$ of the tines 39, whereupon, the rising liquid will flow into the top of the bucket and fill it until sufficient weight of liquid has been acquired to sink the bucket in the surrounding liquid and pull the chain 26$^a$ to operate the switch 25$^x$ and stop the motor and pump.

Manifestly, the levels at which the auxiliary control is to operate will be determined by the vertical location of the bucket 28 or 28$^x$ with reference to the high and low levels in the float chamber and the distance of the abutment or stop—the cap 31 in one case and the horizontal parts 39$^a$ of the tines of the bifurcated arm 39 in the other case—above the high level. This adjustment will depend upon and be controlled by how much leeway is desirable in the rise of liquid in the float chamber above the high level and in the fall of liquid below the low level before the auxiliary control is desired to act.

In order to empty the bucket 28$^x$, I have provided as shown in Figure 2, a flexible member, as a wire or chain, 40, which is attached to an eye 41 fixed to one side of the bottom of the bucket and is extended through an opening 42 in the plug 35. A ring 43 at the top of the said wire or chain supports the same and serves as a grip for use in pulling up on the chain to dump the bucket.

While in describing and illustrating the invention I have presented many details of mechanical construction and arrangement, it is to be understood that the invention is in no way limited thereto except as may be pointed out in the appended claims.

I claim as my invention:—

1. In a float controlled liquid feeding apparatus, in combination with the float chamber. the float therein, and a control member adapted to be operated by the float at predetermined high and low levels of the liquid in the float chamber, an auxiliary control member adapted to be operated to stop the feed when the liquid rises above said high level and when it falls below said low level.

2. In a float controlled liquid feeding apparatus, in combination with the float chamber, the float therein, and the control member adapted to be operated by the float at predetermined high and low levels of the liquid in the float chamber, a normally inoperative auxiliary control member adapted to be operated to stop the feed, a bucket normally floating in the liquid of said float chamber, said bucket being connected to said auxiliary control member, and means for arresting the upward movement of said bucket when the liquid of said float chamber rises above said predetermined high level.

3. In a float controlled liquid feeding apparatus, in combination with the float chamber, the float therein, and the control member adapted to be operated by the float at predetermined high and low levels of the liquid in the flood chamber. a normally inoperative auxiliary control member adapted to be operated to stop the feed, a bucket normally floating in a liquid maintained at the level of the liquid in said float chamber, said bucket being connected to said auxiliary control member, and means for arresting the upward movement of said bucket when the liquid in said float chamber rises above said predetermined high level.

4. In a float controlled liquid feeding apparatus, in combination with the float chamber, the float therein, and the control member adapted to be operated by the float at predetermined high and low levels of the liquid in the float chamber, a normally inoperative auxiliary control member adapted to be operated to stop the feed, a bucket normally floating in a liquid maintained at the level of the liquid in said float chamber, said bucket being connected to said auxiliary control member, means for adjusting vertically the level of said bucket with reference to the high and low levels in the float chamber, and means for arresting the upward movement of said bucket when the liquid in said float chamber rises above said predetermined high level.

5. An auxiliary control to be applied to a float chamber of a float controlled liquid feeding apparatus, comprising a tubular supporting member, a plug adapted to be applied to the top of said float chamber, said plug being provided with an opening through which said tubular member extends, means for adjusting and holding said tubular member in said plug, means for supporting a bucket at the bottom end of said tubular member, said means providing for a vertical movement of said bucket, a normally inoperative control member at the top of said tubular member, a flexible member extending down through said tubular member and connecting said bucket with said auxiliary control member, and a stop adapted to arrest the upward movement of said bucket.

In testimony that I claim the foregoing as my invention, I affix my signature, this 6th day of December, 1924.

ALBERT B. FRENIER.